(12) United States Patent
Orth-Gerber et al.

(10) Patent No.: US 6,340,387 B1
(45) Date of Patent: Jan. 22, 2002

(54) ORGANICALLY POST-TREATED PIGMENTS AND METHODS FOR THEIR PRODUCTION

(76) Inventors: Jürgen Orth-Gerber, Alte Wipperfürther Strasse 81, 51519 Odenthal; Lothar Elfenthal, Zum Bräuhaus 40, D-40764 Laugenfeld; Siegfried Blümel, Ander Deckersweide 24, D-40883 Ratinger, all of (DE)

( * ) Notice: Subject to any disclaimer, the term of this patent is extended or adjusted under 35 U.S.C. 154(b) by 0 days.

(21) Appl. No.: 09/515,570

(22) Filed: Feb. 29, 2000

(30) Foreign Application Priority Data

Mar. 10, 1999 (DE) ......................... 199 10 521

(51) Int. Cl.$^7$ ................................. C09C 3/04
(52) U.S. Cl. ................ 106/447; 106/499; 106/504; 427/402; 428/403
(58) Field of Search ................ 106/447, 499, 106/504; 427/402; 428/403

(56) References Cited

U.S. PATENT DOCUMENTS

| | | | | | |
|---|---|---|---|---|---|
| 3,531,310 A | * | 9/1970 | Goodspeed et al. | ......... | 106/346 |
| 3,808,022 A | * | 4/1974 | Twist et al. | ................. | 106/428 |
| 3,925,095 A | * | 12/1975 | Bockmann et al. | ......... | 106/417 |
| 4,226,637 A | * | 10/1980 | Linden et al. | .............. | 106/499 |
| 4,318,844 A | * | 3/1982 | Kohler et al. | ................ | 524/212 |
| 4,344,799 A | * | 8/1982 | Kohler et al. | ................ | 106/443 |
| 4,375,989 A | * | 3/1983 | Makinen | ..................... | 106/438 |
| 4,921,542 A | * | 5/1990 | Rademachers et al. | ...... | 106/456 |
| 5,035,748 A | * | 7/1991 | Burow et al. | ................ | 106/499 |
| 5,165,995 A | * | 11/1992 | Losoi | ......................... | 428/403 |
| 5,520,340 A | * | 5/1996 | Krockert et al. | ................ | 241/5 |
| 5,567,754 A | * | 10/1996 | Stramel | ....................... | 524/308 |
| 5,830,929 A | * | 11/1998 | Stramel | ....................... | 523/200 |
| 5,843,220 A | * | 12/1998 | Babler | ........................ | 106/415 |

FOREIGN PATENT DOCUMENTS

| | | | |
|---|---|---|---|
| DE | 2331947 | * | 1/1974 |
| DE | 4312035 | * | 10/1994 |
| GB | 1365748 | * | 9/1974 |
| WO | 00/53679 | * | 9/2000 |

\* cited by examiner

Primary Examiner—Anthony Green

(57) ABSTRACT

A method for preparing high quality pigments having improved wettability, dispersibility and gloss characteristics, which method comprises grinding a pigment base material in a jet mill in the presence of an organic grinding aid, recovering ground pigment particles having a first organic layer, comprising the organic grinding aid, and treating the recovered pigment particles with an organic material, forming a second organic layer on the pigment particles, for improving the wettability, dispersibility and gloss characteristics of the treated pigment particles. Titanium dioxide, both untreated and pretreated with an inorganic coating, may be processed according to the method herein to yield high quality titanium dioxide pigment having improved wettability, dispersibility and gloss characteristics. The titanium dioxide pigment is particularly suitable for use in water-thinnable paint systems.

11 Claims, No Drawings

ORGANICALLY POST-TREATED PIGMENTS AND METHODS FOR THEIR PRODUCTION

BACKGROUND OF THE INVENTION

1. Field of the Invention

The present invention relates to novel organically post-treated pigments which are wettable and easily dispersible and methods for producing such pigments. Particularly, the present invention relates to inorganic pigments, such as titanium dioxide, characterized by a twofold organic coating, of which the outer organic layer has amphiphilic properties which improve the pigment wettability and dispersibility and the inner layer, underlying the outer layer, is derived from an organic grinding aid employed when grinding the pigment.

2. Description of Pertinent Art

In addition to forming haze free, high gloss coatings, characteristics of high-grade pigments include good wettability and dispersibility into the medium, such as paint systems, in which the pigments are dispersed. High-grade titanium dioxide pigments commonly have an organic coating which improves their wettability, dispersibility and gloss characteristics when dispersed in a medium such as a paint system. It is known to use glycerine, pentaeryrithritol, trimethylolpropane and triethylolpropane to form organic coatings on either untreated or inorganically coated titanium dioxide pigments for improving the wettability, dispersibility and gloss characteristics of the pigments.

According to German Patent DE 14 67 442, the dispersibility and gloss characteristics of titanium dioxide pigments in paint systems are positively influenced by treatment of the pigments with the reaction products of polyols and ethylene oxide. Surface treatment of titanium dioxide pigments with salts of alkanolamines and hydroxycarboxylic acids also improve dispersibility of the pigments into paint systems.

According to United Kingdom Patent GB 1417574, a mixture of a hydrophilic and a hydrophobic organic material is used as a grinding aid for the pigment in a grinding mill, such as a jet mill. Polyalcohols, carboxylic acids and hydroxycarboxylic acids are cited as hydrophilic organics, while polysiloxane, fatty alchols and dioctyl phthalate are cited as hydrophobic organics.

It is well known to prepare high-grade pigments by grinding titanium dioxide in a jet mill. In most cases, grinding in the presence of steam, as the carrier gas, cannot be dispensed with. Organic materials, such as those described in the paragraph above, are commonly used as grinding aids in the milling process. Such grinding aids improve particle size distribution and transportability, (flowability), of the ground pigment. Also, such grinding aids lower the energy requirements for grinding the pigment.

Pigments are ground in jet mills by a process of attrition. Jet mills have no moving parts. Solid particles, which are to be ground, and a carrier gas are fed into the mill such that the solid particles are suspended in the carrier gas. The internal geometry of the mill imparts a swirling motion to the carrier gas-solid particle suspension such that the solid particles impinge each other and the walls of the mill, thus grinding the particles to smaller size. Organic grinding aids are commonly employed in jet mill grinding operations. The organic grinding aids may be fed into the mill in admixture with the carrier gas, in admixture with the particles to be ground or may be fed separately to the mill.

Titanium dioxide particles are commonly ground to desired pigment particle size ranges in jet mills employing superheated steam as carrier gas. Organic grinding aids, such as those described above, are used to improve particle size distribution and transportability, (flowability), of the ground titanium dioxide and for reducing energy requirements for the grinding process. The organic grinding aids should not be undesirably altered chemically by thermal stress in the milling process. The selection of organic materials is therefore limited by their suitability as grinding aids.

Ground titanium dioxide, from a jet mill, has a surface coating of the organic grinding aids employed in the milling process. This organic coating improves transportability, (flowability), of the ground titanium dioxide. However, organic materials which are most useful as grinding aids are not particularly useful for imparting improved wettability, dispersibility and gloss characteristics to the ground titanium dioxide when it is dispersed as pigment in a medium, such as a paint system, and particularly when the medium is intended to be water dispersible.

Organic materials which are effective for improving wettability, dispersibility and gloss characteristics of titanium dioxide pigments are not particularly effective as grinding aids and are often thermally unstable under conditions within a jet mill employing steam as carrier gas.

Grinding particulate solids in jet mills is well known and widely practiced, as is the use of organic grinding aids in the milling process.

SUMMARY OF THE INVENTION

Now, according to the present invention, we have discovered a novel process for preparing high quality ground pigment for dispersal into a carrier medium such as a paint system.

The process of the present invention comprises grinding pigment particles in a jet mill in the presence of a carrier gas and an organic grinding aid, thereby producing a ground pigment of selected particle size distribution and having an organic surface coating, (Organic I), derived from the organic grinding aid. Then, treating the ground pigment with an organic material to form a second organic coating, (Organic II), on the pigment surface. Wherein, the organic grinding aid is selected for improving particle size distribution and transportability, (flow characteristics), of the ground pigment and energy efficiency of the grinding process, without regard to suitability of the organic grinding aid for improving wettability, dispersibility or gloss characteristics of the pigment. And, the organic material selected for the second coating, (Organic II), on the ground pigment is selected for its efficacy in improving wettability, dispersibility and gloss characteristics of the pigment without regard to the organic material's suitability as a grinding aid, including its chemical stability in the grinding step.

Also, according to the present invention, we have discovered a novel, high-quality pigment comprising a first organic coating, (Organic I), deposited on a pigment particle and a second organic coating, (Organic II), deposited on the first organic coating, which high-quality pigment has improved particle size distribution and improved wettability, dispersibility and gloss characteristics compared to similar pigments of the prior art.

The present invention and its advantages will be described in more detail in the Detailed Description of the Invention, which follows.

DETAILED DESCRIPTION OF THE INVENTION AND PREFERRED EMBODIMENTS

Pigments which may be prepared using the methods of the present invention are those which can be effectively ground by jet milling. Jet milling finds utility for grinding materials ranging from hard, refractory materials to soft, temperature sensitive materials. Titanium dioxide, particularly, benefits from jet milling to form pigments having good particle size distribution. The description of the preferred embodiments, which follows, is directed to preparing titanium dioxide pigments, although, it is to be understood that other high-quality pigments may be prepared using the methods of the present invention.

Titanium dioxide suited for processing according to the method of the present invention is prepared by either the sulfate or chloride process and may be in the rutile or anatase form. Titanium dioxide particles fed to a jet mill should be of a size for efficient grinding in the jet mill. As required, titanium dioxide may be subjected to a pregrinding process, (such as sand grinding), for producing titanium dioxide particles suitable for feeding to the jet milling process. Methods for preparing titanium dioxide particles for grinding in a jet mill are well known and widely practiced on a commercial basis.

The titanium dioxide particles may be uncoated or may have an inorganic coating. For providing an inorganic coating, titanium dioxide particles are suspended in an aqueous phase which may contain dispersing aids, such as polyphosphates, aminoalcohols, polyacrylates or inorganic salts. Salts of inorganic oxides, phosphates or silicates are dispersed into the aqueous suspension. The pH of the aqueous suspension is then adjusted for precipitating the corresponding oxide hydrate, phosphate, borate or silicate onto the titanium dioxide particles. Titanium dioxide, with an inorganic coating is recovered by filtration from the aqueous suspension and is dried in preparation for being fed into the jet mill. Methods for providing titanium dioxide particles with an inorganic coating are well known and widely practiced on a commercial basis.

Titanium dioxide particles, (coated or uncoated), a carrier gas and an organic grinding aid are fed into a jet mill where the titanium dioxide is ground to a particle size distribution suitable for use as a pigment in a selected medium, such as a paint system, cosmetic, etc. Jet mills have no moving parts. Within the jet mill, titanium dioxide particles are suspended in the carrier gas and the suspension has a swirling motion imparted to it by the internal geometry of the jet mill. The titanium dioxide particles are ground by attrition between particles and by impingement with the walls of the mill.

Carrier gas provides grinding energy and transport to the solid particles in a jet mill. Selection of the carrier gas for a grinding operation is based upon cost, efficiency of operation and compatibility with the grinding aids and solids being ground. Superheated steam is commonly required as carrier gas for proper grinding of titanium dioxide in a jet mill.

Organic grinding aids are employed to improve particle size distribution and transportability, (flowability), of the titanium dioxide ground in a jet mill and to reduce energy requirements in the grinding process. The grinding aids are fed to the jet mill either in admixture with the titanium dioxide particles or directly, preferably to the carrier gas in the feed to the mill in an amount of about 0.03 wt. % to about 1.0 wt. %, preferably 0.1 wt. % to 0.5 wt. %, based upon the titanium dioxide fed to the jet mill. The grinding aids selected should not be undesirably altered chemically by stresses in the grinding operation, particularly by thermal stresses where steam is employed as carrier gas. The selection of an organic compound is therefore limited by its suitability as a grinding aid. For example, it is known to use: alkanolamines, such as triethanol amine, triisopropylamine, and 2-amino-2-methyl-1-propanol; polyalcohols, such as trimethylolpropane, trimethylolethane, neopentyl glycol and pentaerythritol; fatty alcohols; fatty acid esters; and mixtures of hydrophilic and hydrophobic organic compounds, such as polyalchols, carboxylic acids and hydroxycarboxylic acids as hydrophilic compounds and polysiloxane, fatty alcohols and dioctyl phthalate as hydrophobic compounds.

Titanium dioxide particles from a jet mill grinding operation as described above have a surface coating of the organic grinding aid, (Organic I). As the organic compounds are selected for suitability as grinding aids, they are not the most suitable compounds for enhancing wettability, dispersibility and gloss characteristics of the titanium dioxide when incorporated as pigment into a selected medium, such as a paint system.

We have discovered that characteristics of pigment particles can be improved for their intended application, particularly for dispersion in paint systems, by applying a selected organic material to the pigment particles after the grinding process. The organic materials are selected for their capacity to improve desired pigment characteristics, without regard to stability of the organic materials in the grinding process. For example, the wettability, dispersibility and gloss characteristics of pigment particles in their intended medium, such as a paint system, can be improved by applying selected organic materials to pigment particles after the grinding process.

Such organic materials may be applied to the ground pigment by any conventional application method. For example, the organic materials may be applied to the pigment particles in pure form, as aqueous solutions or as aqueous emulsions by methods such as spraying, atomizing or vaporization. For pigment particles having an Organic I layer of organic grinding aid, the selected organic materials are applied to form a second, (Organic II), layer on the pigment particles.

The organic materials are selected to be compatible with both the pigment particles and the medium in which the pigment particles are to be dispersed and for their capacity to improve the desired characteristics of the pigment particles. The hydrophilic/hydrophobic character of the pigment particles can be controlled independently of the grinding aid forming an Organic I layer by controlling the quantity and selecting the HLB, (hydrophilic-lipophilic balance), value of the organic material selected to form the Organic II layer on the pigment particles. For example, an amount of organic material in the range of about 0.1 wt. % to about 1.5 wt. %, based upon weight of pigment, having an HLB value in the range of about 10 to 18, may be selected to form the Organic II layer on the pigment particles.

This method of applying organic materials is well suited for forming an Organic II layer on titanium dioxide pigments having an Organic I layer comprised of organic grinding aid, produced by grinding titanium dioxide in a jet mill in the presence of steam and organic grinding aid. The method, is particularly useful for preparing titanium dioxide pigments intended for use in water-thinable paint systems.

The organic materials are selected for their capacity to improve wettability, dispersibility and gloss characteristics of the titanium dioxide pigments as they are dispersed into the intended, medium, paint system. The organic materials selected are preferably of amphiphilic character and are compatible with both the pigment particles to which they are applied and the medium, paint system, in which the pigment particles are to be dispersed.

Suitable organic materials include non-ionic dispersing and wetting agents having an amphiphilic character for compatibility with the pigment particles and the medium in which the pigment particles are to be dispersed. Particularly suitable for use with titanium dioxide pigments, especially pigments intended for use in water-thinable paint systems, are polyoxyethylenealkenyl ethers or ethoxylated polyalcohols having alkenyl or alkyl residues of from about 6 to 22 carbon atoms and polyoxyethylene residues of from about 3 to 40 oxyethylene units. Preferred are polyoxyethylenealkenyl ethers and ethoxylated polyalcohols having HLB, (hydrophilic/lipophilic balance), values in the range of about 10 to 18 and preferably in the range of about 12 to 14. The quantities of polyoxyethylenealkenyl ethers or ethoxylated polyalcohols used are in the range of about 0.1 wt. % to about 1.5 wt. %, preferably about 0.2 wt. % to 0.8 wt. %, based upon the titanium dioxide pigment.

EXAMPLES

In the following examples, titanium dioxide base material manufactured by the chloride process is used. The titanium dioxide base material is placed in aqueous suspension and is ground in a sand mill according to methods well known in the art. The suspension of sand ground titanium dioxide is provided with an $SiO_2$ layer and an $Al_2O_3$ layer according to the well known method and is finally filtered. After drying, the filter cake is broken into "dry clinker" which is further treated in the following examples.

In the following examples, the pigments produced in the examples are evaluated for wettability in water-thinnable paint systems. For such an evaluation, a specific quantity of a pigment is added portionwise under conditions of light stirring to a high gloss emulsion paint system, (which contains all components of a paint up to the reduction step), and the wetting behavior is observed as the pigment is incorporated into the paint. The quantity of pigment remaining at a poor state of wettability at the end of the pigment addition is viewed as a measure of the wettability of the pigment. The smaller the quantity remaining the better the pigment wettability.

In detail, the wettability test is performed as follows. 214 grams of pigment are added portionwise into a dispersion vessel, (Dispermat, 250 ml., φ=8.5 cm), with light stirring, (600 rpm, dispersion disc φ=4 cm), into a formulation of the following composition:

| | | |
|---|---|---|
| 22.0 g | 1,2-propanediol | (Dow Germany, Inc., Frankfurt a.M.) |
| 30.0 g | distilled water | |
| 2.0 g | AMP 90 | (Angust Chemie, Ibbenbüren) |
| 2.4 g | Tego Foamex 805 | (Tego Chemie, Essen) |
| 4.0 g | Surfynol 104E | (Biesterfield & Co., Hamburg) |
| 29.0 g | Neo Cryl BT 24 | (Zeneca, Frankfurt a.M.) |

Pigment wettability is evaluated according to the grading set out in Table I, below, where the "Residual Quantity of Pigment" is the portion of the pigment which is obviously poorly wetted, (that is, is not completely dispersed in the paint medium).

TABLE I

| Wettability | Very Good | Good | Medium/ Good | Medium | Medium/ Poor | Poor |
|---|---|---|---|---|---|---|
| Residual Quantity of Pigment | <25 g | 25–45 g | 45–55 g | 55–65 g | 65–90 g | >90 g |

The dispersibility and gloss characteristics of the titanium dioxide pigments in water-thinnable paint systems are tested by dispersing the pigments into a high gloss emulsion paint. For these tests, a high gloss emulsion paint is prepared according to a standard recipe and is stored for at least 3 days before further processing. The paint, with pigment incorporated, is applied to Morest cards, (Lona Ag, Zurich), at a wet film thickness of 150μ and the paint film is air dried for 2 days. The gloss measurement is made on the dry paint at a 20° angle with a haze-gloss apparatus, (BYK Gardner, Geretsried),. Additionally, the contrast ratio, (KV), (which is a measure of hiding power), of the paint on the Morest cards is measured with a Hunter Lab Colorimeter over a white and black background. The brightness, (L*), and the tint, (b*), are measured with paint on PVC film, (at a wet paint film thickness of 300 μm),over a white background with a Hunter Lab Colorimeter.

Following is the standard recipe of the High Gloss Emulsion Paint used for pigment testing, (at a pigment-volume concentration of 18%).

| Component | Parts by Weight | Source |
|---|---|---|
| propylene glycol | 11.0 | |
| water | 15.0 | |
| AMP 90 | 1.0 | (Angust Chemie, Ibbenbüren) |
| Tego Foamex | 1.2 | (Tego Chemie, Essen) |
| Surfynol 104E | 2.0 | (Biesterfeld & Co., Hamburg) |
| Neo Cryl BT 24 | 14.5 | (Zeneca, Frankfurt a.M.) |
| Titanium Dioxide | 107.0 | |
| After cooling in the container for 10 minutes with ca. 10 m/s dispersing | | |
| water | 28.3 | |
| Rheolate 278 | 18.0 | (Elementis Germany, Inc., Leverkusen) |
| butyldiglycol | 14.5 | |
| methoxybutanol | 15.5 | |
| Neo Cryl XK 75 | 270.0 | (Zeneca, Frankfurt) |
| Tego Foamex 805 | 2.0 | (Tego Chemie, Essen) |
| | 500.00 | |

Example 1

Comparison Example

The titanium dioxide dry clinker is ground in a jet mill common to the titanium dioxide industry with steam as the carrier gas. An aqueous trimethylolpropane solution is added at the feed point of the jet mill as grinding aid, in an amount which produces on the ground pigment a concentration of 0.38 wt. % trimethylolpropane, based on titanium dioxide. The pigment produced is tested for wettability and for gloss in the high gloss emulsion paint, according to the tests described above. Results of the tests are reported in Table 2, below.

Example 2

Comparison Example

The titanium dioxide dry clinker is ground in a jet mill common to the titanium dioxide industry with steam as the carrier gas. An aqueous polyoxyethylenealkenyl ether, (SER AD FN 265, from Servo Delden BV) solution, with an HLB value of 13, is added at the feed point of the jet mill as grinding aid, in an amount which produces on the ground pigment a concentration of 0.50 wt. % polyoxyethylenealkenyl ether, based on titanium dioxide. The pigment produced is tested for wettability and for gloss in the high gloss emulsion paint, according to the tests described above. Results of the tests are reported in Table 2, below.

Example 3

The titanium dioxide dry clinker is ground in a jet mill common to the titanium dioxide industry with steam as the carrier gas. An aqueous trimethylolpropane solution is added at the feed point of the jet mill as grinding aid, in an amount which produces on the ground pigment a concentration of 0.18 wt. % trimethylolpropane, based on titanium dioxide. An aqueous emulsion of polyoxyethylenealkenyl ether, having an HLB value of 13, (SER AD FN 265, product designation of Servo Delden BV), is sprayed onto the titanium dioxide/gas stream exiting the jet mill, to serve as wetting and dispersion agent. The quantity of the emulsion applied is sufficient to provide a concentration of 0.45 wt % polyoxyethylenealkenyl ether on the titanium dioxide. The pigment produced is tested for wettability and for gloss in the high gloss emulsion paint, according to the tests described above. Results of the tests are reported in Table 2, below.

Example 4

Example 3 is repeated, with the difference that the polyoxyethylenealkenyl ether has an HLB value of 18, (that is, a higher proportion of polyoxyethylene).

Example 5

The titanium dioxide dry clinker is ground in a jet mill common to the titanium dioxide industry with steam as the carrier gas. An aqueous trimethylolpropane solution is added at the feed point of the jet mill as grinding aid, in an amount which produces on the ground pigment a concentration of 0.18 wt. % trimethylolpropane, based on titanium dioxide. An aqueous emulsion of ethyloxylated 2-ethyl-2-hydroxymethyl-1,3-propanediol, having an HLB value of 16, (NMO 15, product designation of Servo Delden BV), is sprayed onto the titanium dioxide/gas stream exiting the jet mill, to serve as wetting and dispersion agent. The quantity of the emulsion applied is sufficient to provide a concentration of 0.28 wt % ethyoxylated 2-ethyl-2-hydroxymethyl-1,3-propanediol on the titanium dioxide. The pigment produced is tested for wettability and for gloss in the high gloss emulsion paint, according to the tests described above. Results of the tests are reported in Table 2, below.

Example 6

Example 5 is repeated with the difference that the ethyloxylated 2-ethyl-2-hydroxymethyl-1,3-propanediol has an HLB value of 18.

TABLE 2

| EXAMPLE No. | GRINDING AID | WETTING AND DISPERSING AID | HLB VALUE | ALKYL/ALKENYL RESIDUE | WETTABILITY REMAINDER (g) | WETTABILITY BEHAVIOR | GLOSS 20° | KV (%) | OPTICS L* | OPTICS b* |
|---|---|---|---|---|---|---|---|---|---|---|
| 1 | TRIMETHYOLPROPANE | — | — | — | 90 | MEDIUM/POOR | 41 | 96.7 | 98.14 | 1.29 |
| 2 | POLYOXYETHYLENE-ALKENYL ETHER | — | 13 | $C_{16}$–$C_{18}$ | 85 | MEDIUM/POOR | 41 | 96.3 | 98.00 | 1.35 |
| 3 | TRIMETHYLOL PROPANE | POLYOXYETHYLENE ALKENYL ETHER | 13 | $C_{16}$–$C_{18}$ | 39 | GOOD | 44 | 96.9 | 98.04 | 1.42 |
| 4 | TRIMETHYLOL PROPANE | POLYOXYETHYLENE ALKENYL ETHER | 18 | $C_{16}$–$C_{18}$ | 54 | MEDIUM/GOOD | 41 | 96.5 | 97.91 | 1.21 |
| 5 | TRIMETHYLOL PROPANE | ETHOXYLATED 2-ETHYL-2-HYDROXYMETHYL-1,3-PROPANEDIOL | 16 | $C_6$ | 62 | MEDIUM | 46 | 96.9 | 98.23 | 1.30 |
| 6 | TRIMETHYLOL PROPANE | ETHOXYLATED 2-ETHYL-2-HYDROXYMETHYL-1,3-PROPANEDIOL | 18 | $C_6$ | 59 | MEDIUM | 43 | 96.6 | 98.05 | 1.26 |

It can be discerned, from Examples 3 and 4 compared to Example 2, that the effectiveness of the polyoxyethylenealkenyl ether for improving the wettability, dispersibility and gloss characteristics of titanium dioxide pigment is increased if the thermal stresses of the jet milling operation are avoided. The use of polyoxyethylenealkenyl ether as a grinding aid is possible, however, no advantage accrues. The advantages of the present invention, (improved wettability and improved dispersion of the pigment), are realized only when an effective grinding aid, trimethylolpropane, is used in the jet milling step and the ground titanium dioxide is treated with an effective wetting and dispersing agent, polyoxyethylenealkenyl ether, after the jet milling step.

Comparison of Example 3 and Example 6 show that suitability of a pigment for a particular application can be improved by properly selecting the organic material which is used to form the Organic II layer on the pigment.

While the invention has been disclosed and described in detail in the foregoing description and examples, the same are to be considered illustrative only and not limiting in character, and that many modifications and changes may be made by those skilled in the art without departing from the spirit and scope of the invention which is defined only by the appended claims.

We claim and wish to protect by Letters Patent:

1. In a process for preparing pigment particles for use in water-thinable coatings media, wherein a pigment base is ground in a jet mill in the presence of an organic grinding aid and producing ground pigment particles having a first organic surface coating comprising residue of the organic grinding aid, the improvement comprising:

applying to the ground pigment particles from about 0.1 to 1.5 wt. %, based upon weight of the ground pigment particles, of an amphiphilic organic compound having a hydrophilic-lipophilic balance value in the range of about 10 to 18 for depositing a second organic surface coating overlaying the first organic surface coating on the ground pigment particles.

2. The process of claim 1, wherein the pigment base is selected from the group consisting of titanium dioxide and inorganically pre-treated titanium dioxide.

3. The process of claim 2, wherein the amphiphilic organic compound is selected from the group consisting of polyoxyethylenealkenyl ethers, ethoxylated polyalcohols and mixtures thereof.

4. The process of claim 3, wherein the amphiphilic organic compound is an ethyoxylated fatty alcohol.

5. The process of claim 3, wherein the amphiphilic organic compound has an hydrophilic-lipophilic balance value in the range of about 12 to 14.

6. A pigment selected from the group consisting of titanium dioxide and inorganically pretreated titanium dioxide particles, said particles having a first organic coating layer comprising residue of an organic grinding aid and a second organic coating layer, overlaying the first organic coating layer, comprising an amphiphilic organic compound having a hydrophilic-lipophilic balance value, (HLB), in the range of about 10 to 18.

7. The pigment of claim 6, wherein the amphiphilic organic compound is selected from the group consisting of polyoxyethylenealkenyl ethers, ethoxylated polyalcohols and mixtures thereof.

8. The pigment of claim 7, wherein the amphiphilic organic compound comprises an ethoxylated fatty alcohol having an hydrophilic-lipophilic balance value, (HLB), in the range of about 12 to 14.

9. A paint composition comprising a water-thinable paint medium having dispersed therein pigment selected from the group consisting of titanium dioxide and inorganically pre-treated titanium dioxide particles, said particles having a first organic coating layer comprising residue of an organic grinding aid and a second organic coating layer, overlaying the first organic coating layer, comprising an amphiphilic organic compound having a hydrophilic-lipophilic balance value, (HLB), in the range of about 10 to 18.

10. The paint composition of claim 9, wherein the amphiphilic organic compound is selected from the group consisting of polyoxyethylenealkenyl ethers, ethoxylated polyalcohols and mixtures thereof.

11. The paint composition of claim 10, wherein the amphiphilic organic compound comprises an ethoxylated fatty alcohol having an hydrophilic-lipophilic balance value, (HLB), in the range of about 12 to 14.

* * * * *